United States Patent [19]

Robison et al.

[11] Patent Number: 5,294,949
[45] Date of Patent: Mar. 15, 1994

[54] METHOD AND APPARATUS FOR MAGNETIC COMMUNICATION VIA A PHOTOGRAPHIC FILMSTRIP USING TRAPPABLE DATA SENTINELS

[75] Inventors: Gary L. Robison; Fernando G. Silva, both of Rochester, N.Y.

[73] Assignee: Eastman Kodak Company, Rochester, N.Y.

[21] Appl. No.: 811,564

[22] Filed: Dec. 20, 1991

[51] Int. Cl.$^5$ .............................................. G03B 17/24
[52] U.S. Cl. ...................................... 354/106; 355/40; 360/48; 360/72.1
[58] Field of Search ................. 354/105, 106; 355/40, 355/41; 360/3, 39, 40, 48, 72.1; 352/236

[56] References Cited

U.S. PATENT DOCUMENTS

| | | | |
|---|---|---|---|
| 4,215,920 | 8/1980 | Butler | 352/92 |
| 4,422,111 | 12/1983 | Moeller et al. | 360/72.1 |
| 4,491,399 | 1/1985 | Bell | 352/92 |
| 4,835,628 | 5/1989 | Hinz et al. | 360/48 |
| 4,965,627 | 10/1990 | Robison | 355/40 |

OTHER PUBLICATIONS

"DATAKODE Magnetic Control Surface", Eastman Kodak Company, 1983, 31 pages.

Primary Examiner—Michael L. Gellner
Assistant Examiner—Howard B. Blankenship
Attorney, Agent, or Firm—Heslin & Rothenberg

[57] ABSTRACT

Overhead and data loss are reduced when transferring data via magnetic recording in a magnetic layer of an elongate photographic filmstrip, by providing a trappable data sentinel at the beginning of a data field. The data sentinel comprises a pair of reserved characters which establish a data character boundary for data in the field and also identify the nature of this data. The data sentinel is trapped by an identity comparator and also read by a host computer or processor. Data fields employing the data sentinel format can be embedded within a start sentinel/end sentinel track architecture.

24 Claims, 7 Drawing Sheets

START/END SENTINEL DATA STRUCTURE, TWO DIFFERENT DATA FIELDS

START/END SENTINEL DATA STRUCTURE, ONE FIELD REPEATED 3 TIMES

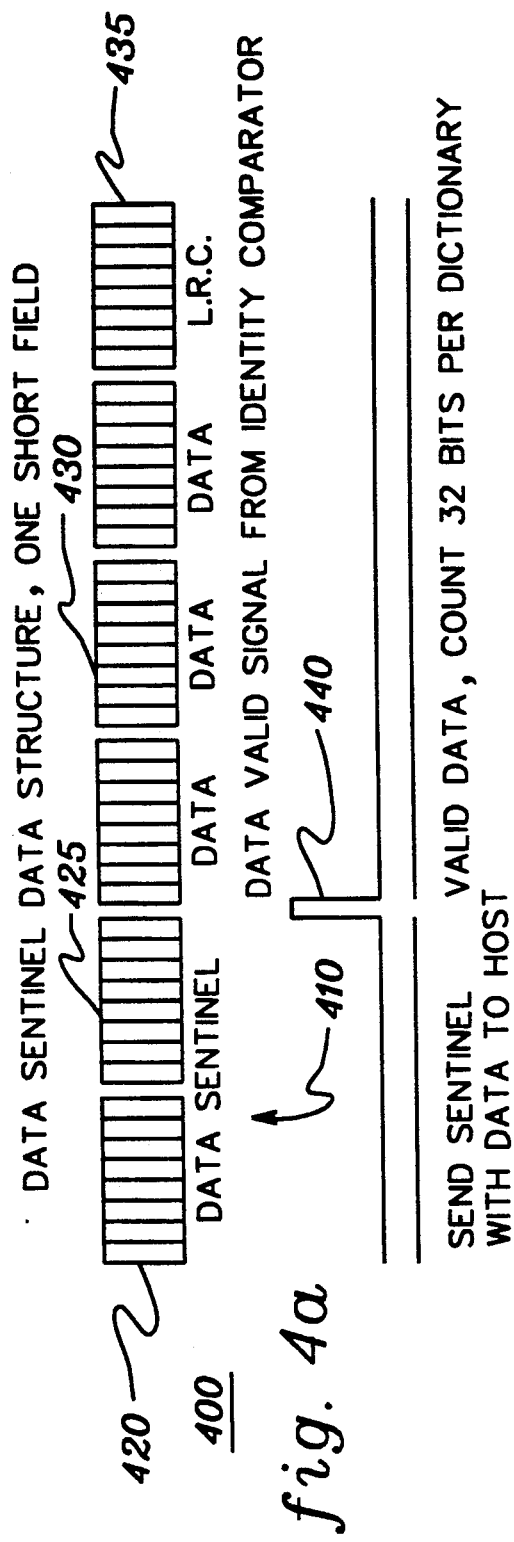
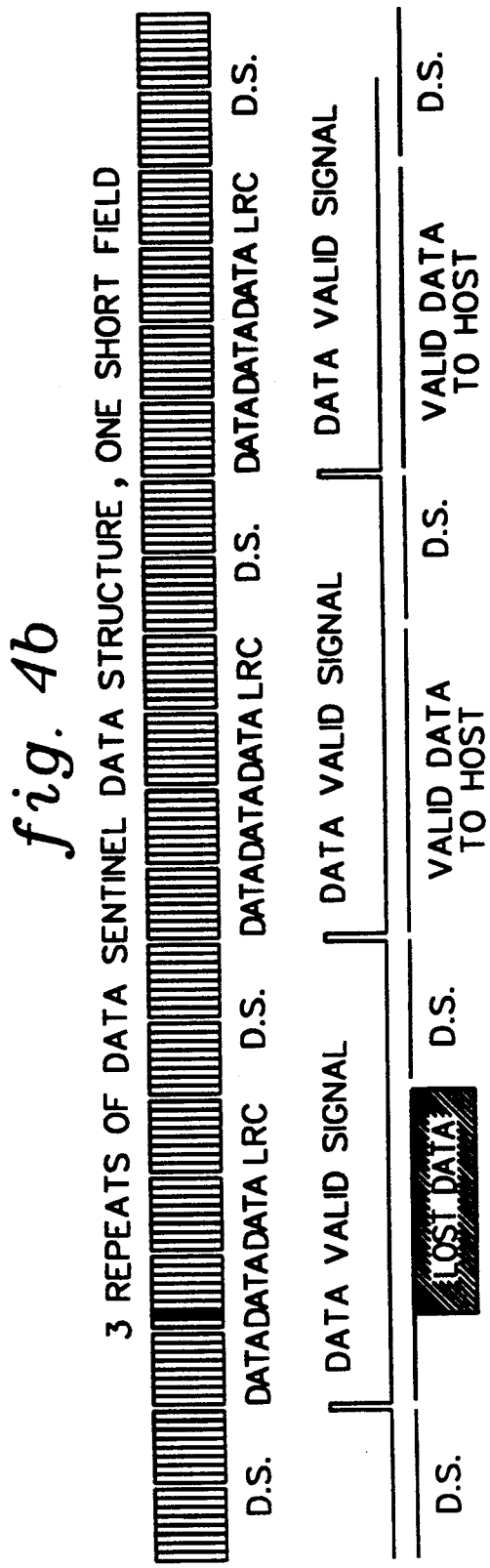

fig. 5a  START/END SENTINEL STRUCTURE WITH EMBEDDED DATA SENTINEL
fig. 5b  RESTORATION OF DATA CHARACTER BOUNDARY BY DATA SENTINEL

METHOD AND APPARATUS FOR MAGNETIC COMMUNICATION VIA A PHOTOGRAPHIC FILMSTRIP USING TRAPPABLE DATA SENTINELS

BACKGROUND OF THE INVENTION

1. Technical Field

This invention relates generally to data communication between stages of photographic filmstrip use and processing wherein data is recorded in a magnetic layer of the photographic filmstrip at a first stage and read out at a second stage. More particularly, the invention relates to a method and apparatus for reducing overhead and data loss due to drop-outs and other data corruption errors, in such data transfer.

2. Background Information

Data communication between different stages of film use and processing (e.g. a camera user and dealer or photofinisher) has traditionally required separate written forms. This has not proven to be a very convenient or efficient method of relaying important information from one stage to another.

In the early 1960's, an innovation in data communication for motion picture film was introduced. A thin layer of magnetic oxide, referred to as a DATAKODE Magnetic Control Surface, was coated across the entire back surface of a roll of motion picture film to provide the capability to magnetically record digital data on the film without interfering with normal photographic use of the film.

The DATAKODE Magnetic Control Surface permitted recording of different types of digital data at different stages of production of a motion picture. Such data could range from camera, lighting and filter data at the time of shooting to printer exposure control information in the laboratory to theatre automation control signals during exhibition. The availability of the DATAKODE Magnetic Control Surface over the entire surface of the motion picture film allowed multiple types of data to be recorded on the same piece of film.

The DATAKODE Magnetic Control Surface was specifically applied to the recording of SMPTE time code on motion picture films. Two formats were proposed for recording the SMPTE time code: a standard continuous longitudinal time code format, and a frame limited burst type format. The latter format was preferred because of its ready adaption to the intermittent motion of the film during normal picture exposure and projection operations.

The SMPTE time code served essentially as a machine-readable frame address code for the motion picture film. The continuous time code included 26 bits of frame identification, 32 spare user bits, a 16-bit sync word, and 6 other miscellaneous data bits. The burst type code added a 16-bit sync word and an 8-bit preamble to the beginning and an 8-bit postamble to the end of the 80 bits of continuous time code. Gaps between time code bursts of different frames were filled with a pattern of alternating ones and zeros.

Regardless of whether the continuous or burst format was employed, the binary structure of each data field was exactly the same as every other data field, predefined by the SMPTE time code application.

More recently, a film information exchange system using dedicated magnetic tracks has been developed for use in still photography. A virtually transparent magnetic layer on the still photography filmstrip facilitates the magnetic recording of data in one or more longitudinal tracks of each film frame. With a virtually transparent magnetic layer, data recording may be done everywhere on the film including in the image area, so that all relevant information can be theoretically recorded with each frame of the film. In order to provide quick access to particular data at any stage of film use, related data is preferably grouped and recorded in specific predetermined tracks. Camera data, for example, can be recorded in several dedicated longitudinal tracks along the filmstrip edges. The camera data, as well as other data, is preferably recorded in pulse position encoded form in order to be independent of film transport velocity.

In this earlier system, each track is preferably frame limited and a two character start sentinel is recorded at the beginning of the track and a two character end sentinel is recorded at the end of the track. Between the start sentinel and end sentinel, a plurality of consecutive self-identifying data fields can be recorded. Each field begins with a single character field sentinel followed by a two character identification (ID) code, appropriate data characters and a parity character. The field sentinel signifies the beginning of each field and preferably identifies the source of the data in the field. The identification code, by reference to a dictionary stored in memory, identifies the nature of the data in the field and an appropriate decoding scheme. The parity character facilitates error correction for the ID code and data characters within the field. This basic data architecture, as well an alternative employing virtual identification codes, are fully described in commonly assigned U.S. Pat. No. 4,965,627, the disclosure of which is incorporated by reference herein.

The self-identifying data field feature of the Film Information Exchange System Using Dedicated Magnetic Tracks facilitates rapid accessing and reading of particular desired data by different stages of film use and processing. These and other significant advantages and benefits are fully described in U.S. Pat. No. 4,965,627 and the related patents referenced therein.

However, under certain circumstances, the data architecture of this earlier system may not be optimal. If a drop-out (e.g. lost bit) occurs early in a track, decoding of all subsequent data in the track may be compromised, potentially resulting in significant data loss or difficult data reconstruction. Also, particularly when a short data field is to be repetitively recorded, the Film Information Exchange System Using Dedicated Magnetic Tracks may involve excess overhead. Overhead refers to characters or bits recorded for control or identification purposes. Commonly assigned, concurrently filed U.S. patent application Ser. No. 07/811390 entitled METHOD AND APPARATUS FOR MAGNETICALLY COMMUNICATING VIA A PHOTOGRAPHIC FILMSTRIP WITH ENHANCED RELIABILITY by Arthur Whitfield, et al., describes an approach for extending the Film Information Exchange System to a simple, low cost camera, in which a data field containing a limited data set is repetitively recorded along a track of a film frame. In such systems, it is desirable to reduce overhead in order to increase the number of repeating data fields that can be recorded within the limited track length.

In other environments, various approaches have been developed for formatting data to be recorded in a magnetic track. U.S. Pat. No. 4,835,628 to Hinz, et al. describes an apparatus and method for formatting and recording digital data in discrete stripes on magnetic tape using a helical scan arrangement. Formatting in the data area of each stripe includes recording of digital information within preamble, data block, and postamble sections. The preamble section provides frequency/phase and location referencing, the data block section includes a plurality of physical data blocks each of which are divided into sub-blocks that include synchronizing and segment identifying information along with data to be recorded, and the postamble section ensures compatibility of physical alignment between the recording heads and magnetic tape.

U.S. Pat. No. 4,422,111 to Moeller, et al. describes a method of preformatting magnetic tape intended for use in high capacity data cartridges by prerecording identifying blocks on the tape across the full width of the tape in order to segment the tape into identifying sections between which data can be recorded in eight tracks following a serpentine pattern. Data frames in the tracks comprise a preamble, header, data portion, CRC code word, and an interframe gap. The header portion includes a track and frame number, record number, a record type number, and a character count. By inference, it would appear that prior to looking for an address in this data structure one has to consult a dictionary and determine the tape address of the data of interest.

In addition to overhead and data loss considerations, the application of magnetics on photographic film to transfer data raises other unique concerns. As a magnetic recording material, photographic film is relatively thick and not as compliant as typical magnetic tape. Further, the recording environment in many cameras is not as controlled and can suffer from higher error rates due to unsophisticated film transports systems, low power batteries, poor head-to-film interface and other physical disturbances.

A need therefore exists for a data formatting approach which ensures the reliable transfer of data via magnetic recording on a photographic filmstrip with low overhead and data loss even when the data transfer is subject to such corruption errors.

SUMMARY OF THE INVENTION

This need is satisfied, the limitations of the prior art overcome, and other benefits realized, in accordance with the principles of the present invention, through the use of a data field format employing a trappable data sentinel. The data sentinel can perform all of the functions of the start sentinel, field sentinel and ID code of the prior Film Information Exchange System.

In accordance with one aspect of the present invention, a data field is recorded in a magnetic area, or a track of a magnetic layer, of an elongate photographic filmstrip. The data field comprises a trappable data sentinel and at least one data character. The data sentinel consists of a pair of reserved characters forming a sequence of bits which appear nowhere else in a valid data stream. The data sentinel is thus trappable, and is preferably detected by an identify comparator which examines a serial bit stream, bit-by-bit. The data sentinel establishes a character boundary for the data character(s) and identifies the type of data in the data field.

In accordance with a further aspect of the invention, the first character of the data sentinel character pair may define a source of the data as well as the beginning of the data field. The second character of the data sentinel character pair can provide an indication of the content, length and structure of the data field. The character pair forming the data sentinel is preferably asymmetrical to provide a directional indication.

In accordance with another aspect of the present invention, the data field comprises the following sequence of characters: the data sentinel character pair, one or more data characters and a longitudinal redundancy check character, all of which are preferably recorded in pulse position encoded form.

In accordance with a further aspect of the present invention, a data field prefaced by a trappable data sentinel can be imbedded in the start sentinel/end sentinel data architecture. In this situation, the first character of the data sentinel character pair acts as the field sentinel of the earlier data architecture.

Data fields formatted in accordance with the principles of the present invention can be read by a magnetic read head and the resulting serial bit stream passed through a shift register to a data sentinel identity comparator. This comparator provides a pulse output when a sequence of consecutive bits matches the bit pattern of the data sentinel. The pulse output can be provided to a processor for use as a reference in parsing the binary bit stream into characters. The read data sentinel also provides a basis for interpreting the data characters of the data field. When a data field prefaced by a data sentinel is imbedded within the start sentinel/end sentinel architecture, additional identity comparators can be used to detect the start and end sentinels. Outputs of these additional identity characters are fed to a latch or other logic circuitry which provides a signal to the processor during a time interval between detection of the start sentinel and detection of the end sentinel.

The invention contemplates apparatus and methods for formatting, recording and/or reading such a data field, as well as a photographic filmstrip containing such a data field.

BRIEF DESCRIPTION OF THE DRAWINGS

The foregoing and other features, aspects and advantages of the present invention will be readily understood from the following detailed description of a preferred embodiment, when considered in conjunction with the accompanying drawings, in which:

FIG. 1b is a cross-sectional view of the filmstrip of FIG. 1a;

FIG. 4a illustrates the data sentinel format of a data field in accordance with the principles of the present invention;

FIG. 4b illustrates the effect of a dropped bit upon repeating data fields formatted in accordance with the data sentinel architecture of the present invention;

FIG. 5a illustrates the start/end sentinel structure with an embedded data field having a trappable data sentinel;

FIG. 5b illustrates the restoration of a data character boundary by a data sentinel in the embedded data field embodiment of FIG. 5a.

DETAILED DESCRIPTION

The present invention is especially designed to reduce overhead and data loss and enhance the reliability of data transfer between stages of photographic filmstrip use and processing. The stages can include a film manufacturing operation, a camera, a dealer order entry station, and a photofinisher. Other stages or substations of these stages, may be used in the film use and processing system. The photofinisher, for example, may include order entry, classifier, printer, inspection and makeover, sorter, and enveloper stations, each with independent data communication capabilities. The present invention is applicable to data communication between any of said stages and stations but for ease of discussion, will be described in the context of data communication between a camera and a photofinisher.

Figure 1A:
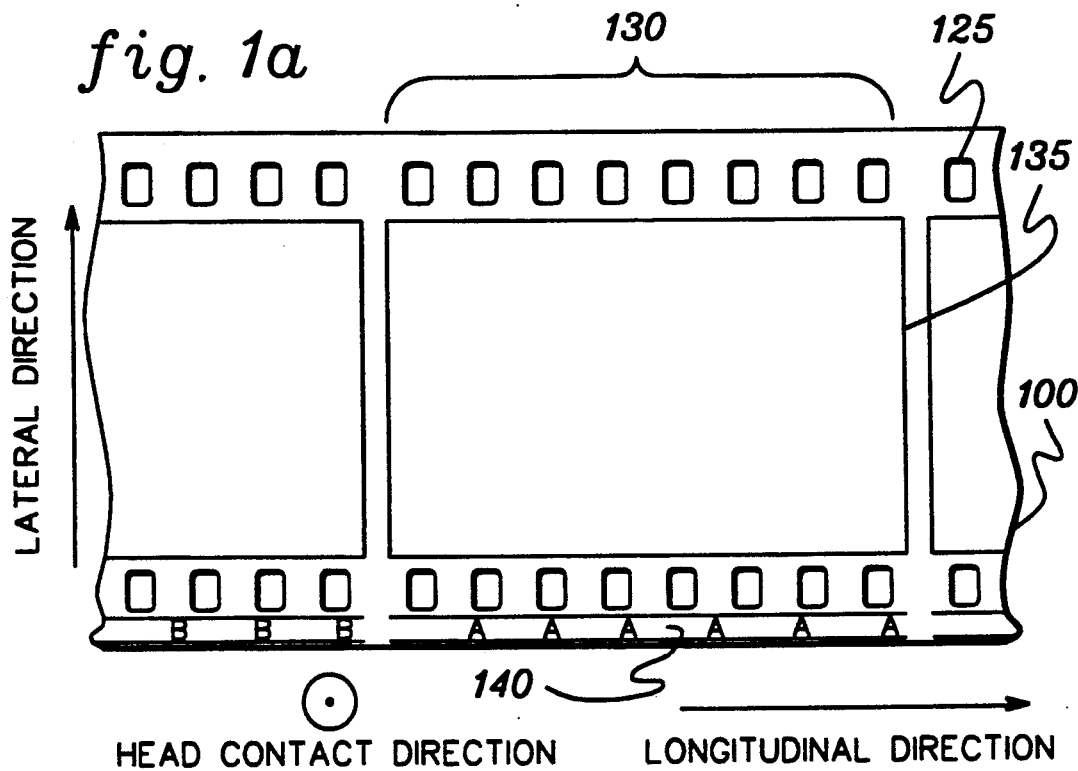
FIG. 1a is a partial plan view of a photographic filmstrip having a longitudinally extending track recorded in a magnetic layer of the filmstrip.
Figure 1B:
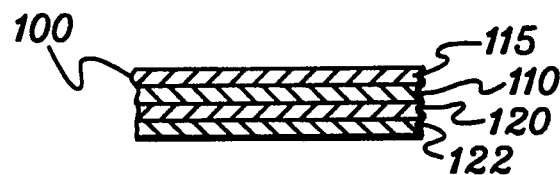

Data communication between different stages of photographic filmstrip processing and use is effected by employing the filmstrip as a magnetic recording medium. Referring to FIGS. 1a and 1b, a strip 100 of color negative film, e.g. 35 mm wide, includes a base 110, various well-known photo-chemical layers 115 on one side of the base 110, and a magnetic layer 120 on the other side. An anti-static and lubricating layer 122 overlies the magnetic layer 120. Filmstrip 100 includes perforations 125 spaced along both film edges at regular intervals matching the pitch of a metering pawl of a film transport system in a camera. Filmstrip 100 further includes a series of consecutive frames 130 each having a central image area 135.

If data is to be magnetically recorded in the vicinity of image area 135, magnetic layer 120 is made virtually transparent at least in that portion of the magnetic layer which is coextensive with image area 135. This permits normal photofinishing of an exposed image in the image area 135. If the magnetic recording material is excluded from image area 135, it need not be virtually transparent. Suitable materials for forming the magnetic layer 120 include a thin layer of iron oxide or other compositions with similar characteristics which are familiar to those skilled in this art.

In the earlier developed high density full magnetics data transfer system, multiple longitudinally extending tracks were dedicated to magnetic recording of a full complement of camera related data. However, as described in commonly assigned co-pending U.S. patent application Ser. No. 07/811390, entitled METHOD AND APPARATUS FOR MAGNETICALLY COMMUNICATING VIA A PHOTOGRAPHIC FILMSTRIP WITH ENHANCED RELIABILITY by Whitfield, et al., in a simple camera, only a single relatively wide track 140 need be used to record camera data. Since in inexpensive cameras only a limited set of data (e.g. scene information, date and time) needs to be delivered, a short data field (e.g. "A") is written multiple times along the length of track 140. The limited data field, e.g. of 80 bits, can thus be repeated six times within a 24 mm track of a film frame at 20 bits per millimeter nominal bit density. This linear redundancy significantly reduces the length of film over which good head-to-film interface must be maintained and enhances the prospects of successful data transfer.

Figure 1C:
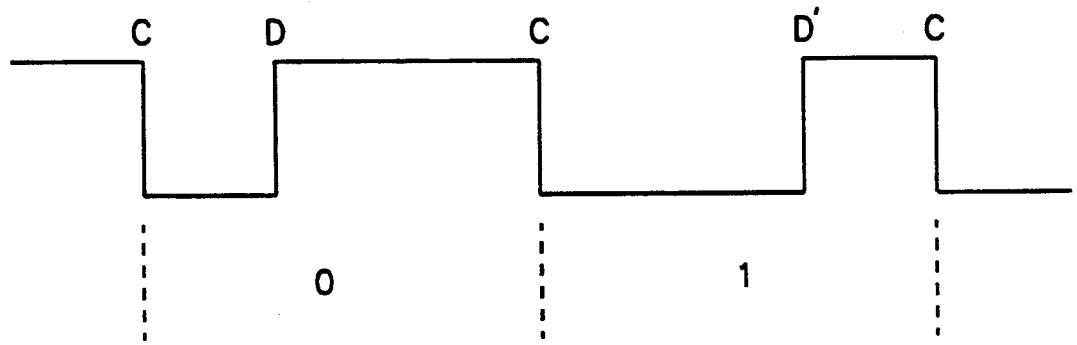
FIG. 1c depicts a pulse position encoding scheme advantageously employed in the present invention.

Data is preferably recorded in longitudinal track 140 (or multiple parallel such tracks, not shown) using a pulse position encoding scheme. Data to be recorded is first converted into binary bits and then encoded using a three-part code. As illustrated in FIG. 1c, the code comprises a serial stream of pulse edge transitions of a first type (e.g. negative-going edge transitions) and those of a second type (e.g. positive-going edge transitions) in alternating sequence. The first type pulse transitions serve as clock ("C") indicators while the second type serve as binary data indicators. A binary 0 is indicated by a second type pulse transition ("D") which is temporally closer to the immediately preceding clock ("C") pulse transition and farther from the succeeding clock transition. A binary 1 is indicated by a second type pulse transitions ("D'") temporally closer to the succeeding clock pulse transition than to the preceding one. With this pulse position encoding scheme, film transport velocity can vary during recording and playback without affecting the ability to synchronize and read the recorded data. Thus, for example, a camera may record data in track 140 while advancing the film between exposures without imposing any velocity controls or requiring recording of an independent clock signal. Alternatively, other data encoding techniques which afford film-velocity independence can be used.

Figure 2:
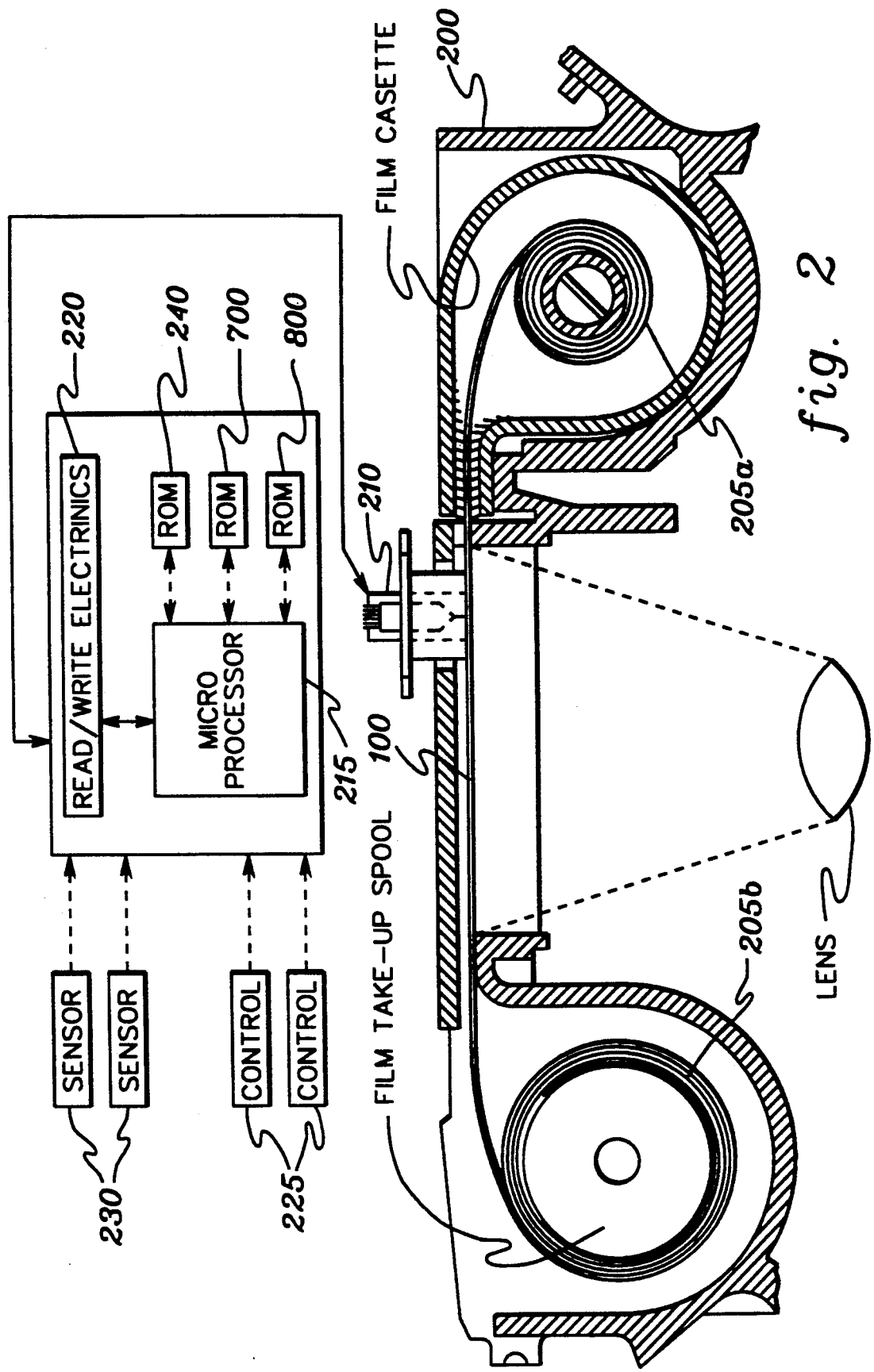
FIG. 2 is a simplified diagram of a camera adapted to record and/or read data fields in a magnetic layer of a photographic filmstrip.

Referring to FIG. 2, a camera 200 transports the filmstrip 100 between the reels 205a and 205b of a film cartridge or cassette. A take-up sprocket or metering pawl (not shown) conforming to the pitch of perforations 125 of filmstrip 100 facilitates film transport. Any conventional film transport mechanism can be used in camera 200. The camera 200 includes a magnetic read/write head 210 in close proximity with the magnetic layer 120 on the unsensitized side of the filmstrip 100. A microprocessor 215 controls magnetic data recording or playback by the head 210 through head electronics 220.

Microprocessor 215 may accept information to be magnetically recorded on the filmstrip 100 from camera controls 225 and/or sensors 230. Microprocessor 215 includes a read only memory 240 containing instructions for ensuring that each type of information received is recorded in an appropriate track and in accordance with a preferred data architecture described hereinafter. The microprocessor sorts and buffers information in compliance with the instructions stored in the read only memory 240. One advantage of the longitudinal track format of FIG. 1 is that magnetic recording of data on the filmstrip 100 may be performed by the camera 200 using a relatively stationary head 210 by buffering all of the data to be recorded in a particular frame track and then transmitting the data to the head just as the filmstrip is being wound to the next frame.

Data fields in track 140 are created by displacing filmstrip 100 in a longitudinal direction past recording head 210. Film jitter in the longitudinal direction (reference FIG. 1a) may produce pulse position errors. Spacing errors in the head contact direction due, for example, to dimples in the film or to dirt can also corrupt data transfer. Super positioning of adjacent pulses may result in low signal error. The filmstrip 100 may also wander in a lateral direction relative to the stationary recording head causing track 140 to meander from its nominal track path. The present invention recognizes that such perturbations in the three orthogonal directions can introduce corruption errors in the transferred data and accordingly includes means for diminishing the impact of such errors through the provision of a new data field structure, as discussed hereinafter.

Figure 3A:
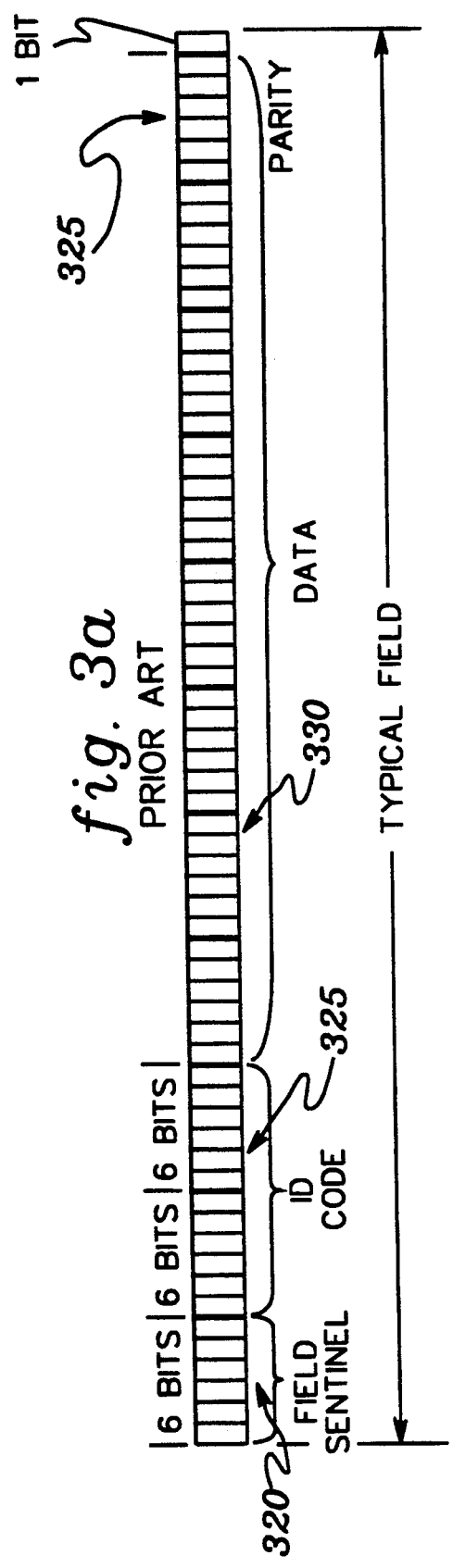
FIG. 3a depicts the data structure of a typical field of the prior art Film Information Exchange System.
Figure 3B:
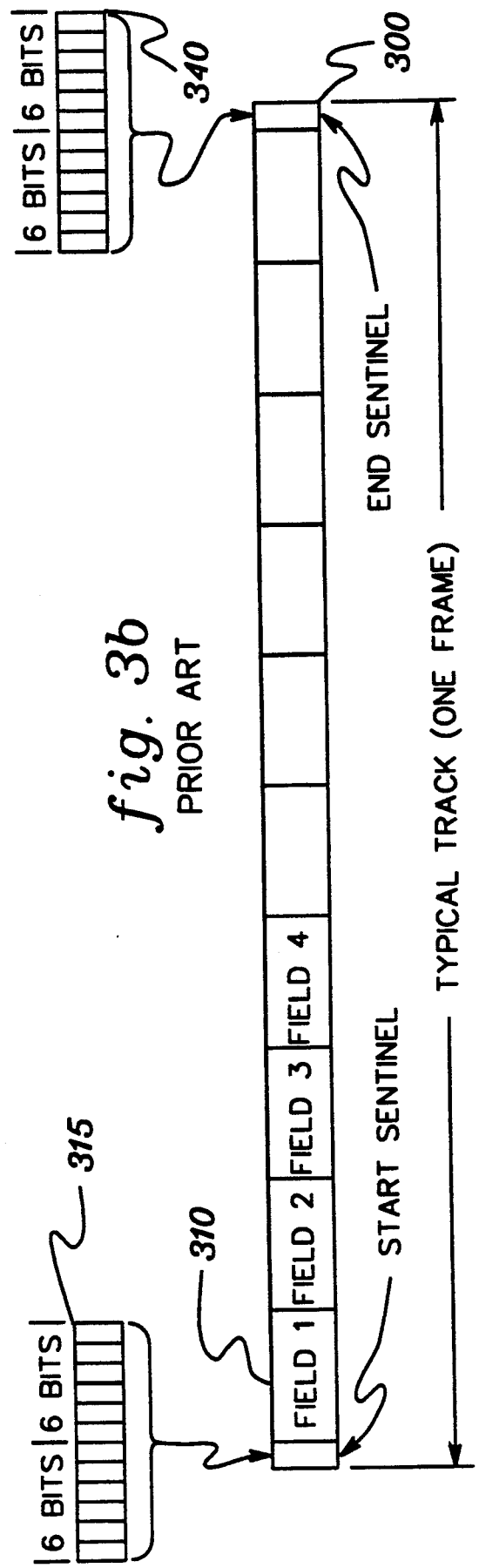
FIG. 3b depicts the start sentinel/end sentinel data architecture of a typical track of the prior art Film Information Exchange System.

FIGS. 3a-d illustrate the data architecture of the previously developed Film Information Exchange System Using Dedicated Magnetic Tracks. As shown in FIG. 3b, a track 300 is typically coextensive with a filmstrip frame 130, and is divided into a plurality of data fields 310. Track 300 includes a two character start sentinel 315 at the beginning of the track and a two character end sentinel 340 at the termination of the track. Start sentinel 315 and end sentinel 340 notify a read/write system in a stage of filmstrip use and processing of the beginning and termination locations, respectively of the track 300.

As shown in FIG. 3a, a typical field in the earlier data architecture includes a one character field sentinel 320, a two character identification (ID) code 325, data characters 330 and a parity character 335. The purpose of the field sentinel 320 is to notify the read/write system of the beginning location of each succeeding field in the track 300. The purpose of the ID code 325 is to identify the type of information recorded in the field. The data characters 330 convey the relevant data while parity character 335 provide for single bit (Hamming) error correction for the ID code 325 and the data characters 330.

In this earlier architecture, all of the characters were six bits long; the start sentinel characters, end sentinel characters and field sentinel character were all reserved for their respective purposes.

The ID code recorded near the beginning of each field is determined by the type of information to be recorded in that field. In a full magnetics system, a unique ID code can be assigned to each parameter or information type to be recorded on the filmstrip, so that the ID codes for all possible information types constitute a dictionary. Inasmuch as the same dictionary must be employed by all stages in the life cycle of the filmstrip, an identical read only memory 700 can be provided at each stage. Each of these memories embodies a universal ID code dictionary and controls the reading and writing of ID codes at each stage of film use and processing.

The advantage of such self-identifying data fields is that the placement of a particular parameter within a track by the camera need not be previously known by the photofinisher in order for the photofinisher to be able to find that parameter on the track, since the photofinisher may simply refer to the corresponding ID code recorded by the camera. This same advantage holds between any other separate stages, where one stage writes data onto the filmstrip and the other independently reads the data from the filmstrip at a later time and, typically, at a different location.

The two characters of the ID code as well as the data characters comprise unreserved alphanumeric symbols. Each alphanumeric symbol is represented by a particular pattern of six binary bits. Each such bit pattern can comprise a set of microcodes stored in a read only memory 800 connected to the microprocessor 215. Read only memory 800 defines a universal symbol dictionary which can be used to perform reading and writing of data fields at all stages of film use and processing. The read only memory 800 not only defines the ID code and data characters, but also defines the six-bit patterns which are reserved for control purposes and which therefore may not be used for information or data, i.e. the characters of the start sentinel 315, the field sentinel 320 and the end sentinel 340.

As shown in FIG. 2, the microprocessor 215 in the camera 200, while referring to the read only memory 240 for track location and data field format, also refers to read only memories 700 and 800 for the universal ID code dictionary and universal symbol dictionary in order that subsequent readers of the data recorded by the camera 200 may properly interpret the data.

Figure 3C:
FIG. 3c is a further illustration of the prior art start/end sentinel data structure showing two different data fields.

FIG. 3c illustrates the start/end sentinel data structure sandwiching two different data fields. For clarity of presentation, characters are shown separated from their neighbors in FIG. 3c and subsequent figures. As shown, the start sentinel (SS) creates a data valid condition and the end sentinel (ES) creates a data invalid condition. The data string between the start and end sentinel is provided to a host computer or other processing means for interpretation. This data string is separated into two data fields by parsing the bit string into data characters of six bit length, identifying the start of each field by the field sentinel (FS) reserved character, and identifying the data type with the ID code by referencing the dictionaries stored in the read only memories.

This prior art data structure requires the correct reading of a start sentinel, a field sentinel, an ID code, and an end sentinel in addition to the data itself. Therefore the minimum data structure permitted within this architecture is eight characters long (SS=2, FS=1, ID=2, DATA=1, ES=2). For a more typical single short data field of three data characters and a parity character, there would be seven overhead characters excluding the parity character. One of the goals of the present invention is to facilitate a reduction in this overhead.

Figure 3D:
FIG. 3d illustrates the effect of a dropped bit in the prior art start/end sentinel data structure.

FIG. 3d depicts the impact of a drop-out or lost bit upon data transfer in the earlier architecture. If a drop-out occurs early in a track, all subsequent data in the track may be lost or, at best, a time consuming reverse reconstruction of data characters would have to be undertaken. One of the principle advantages of the data structure of the present invention is a significant reduction in potential data loss due to a lost bit.

The data field structure of the present invention is illustrated in FIG. 4a. The data field 400 consists of a trappable data sentinel 410, one or more data characters 430 and a longitudinal redundancy check (LRC) character 435. The data sentinel comprises a character pair selected from all possible combinations of reserved characters by the exclusive characteristic that they form a 2n bit binary sequence which appears nowhere else in a valid data string and the additional characteristic that when combined with any valid character leading or trailing the data sentinel in the data bit stream, they do not form a valid sentinel. Accordingly, the trappable data sentinel can be detected by its unique sequence of 2n consecutive bits within a read bit stream. ("n" represents the bit length of a character.)

The data sentinel character pair can, in effect, replace and perform the function of the two character start sentinel, single character field sentinel and two character ID code of the earlier data architecture. The trappable data sentinel 410 establishes a character boundary for the data characters 430 of the data field 400 and also identifies the nature of the data recorded in the field. Like the earlier field sentinel, the first character 420 of the data sentinel 410 establishes the beginning of the data field. A second character 425 of the data sentinel character pair, like the prior ID code, provides an indication of the nature of the recorded data, e.g. the content, length and structure of the data field. The trappable nature of the data sentinel provides a data valid signal or pulse output 440 which can be used as a start boundary for parsing the data field.

The LRC character 435 provides a preferred mechanism for error checking and correction within a data field. The use and implementation of such LRC characters is well known to those versed in this art. Details regarding longitudinal redundancy checking can be found, for example, in PRACTICAL ERROR CORRECTION DESIGN FOR ENGINEERS (Second Edition) 1988 by Neal Glover and Trent Dudley, published by Data Systems Technology, Corp., pages 4–6. Other alternative error checking and correction schemes may be incorporated into the data structure of the present invention.

One of the advantages of the data field structure of the present invention is the reduction in overhead. Ignoring the error checking character, a limited set of three data characters requires only two characters of overhead in the data sentinel structure, in contrast to the seven characters of overhead in the earlier system.

The new data field format employing a trappable data sentinel also reduces the extent of potential data loss due to a drop out as graphically illustrated in FIG. 4b. Since the trappable data sentinel provides a data valid signal for each field, the impact of a lost bit is limited to the particular field in which the lost bit occurs. Thus potential data loss and/or reconstruction is significantly reduced.

As best seen in FIG. 4a, each character of the new data field architecture is preferably eight bits long, e.g. a 7-bit ASCII code with an odd parity bit. This standardized data word length is more conventional than the earlier employed 6-bit characters. However, the invention can be practiced using other bit length characters. In the new data architecture, the data sentinel is both read to identify and decode the data in the field, and trapped to establish a data character boundary for parsing the data field. None of the sentinels or ID code of the earlier architecture manifested both of these characteristics or served both functions.

Even though the number of character pairs having the proper characteristics for a data sentinel is limited, there are applications where these characteristics can be advantageously utilized to greatly increase the density of data compared to overhead characters. One advantage from this change in format is that more data can be written within a given data track length without increasing the bit density of the recording. Another related advantage is the improvement in system reliability that can be obtained by taking advantage of the shortened data field structure.

In certain situations it may be desirable to protect some data by using the data sentinel format to provide extremely high reliability while at the same time other information may be recorded that requires only normal reliability. In this case, the use of data sentinels having the same first character as the field sentinel used in that recording application can be a considerable advantage in that the data sentinel format can be used within the start sentinel/end sentinel data structure without confusing the readout and interpretation apparatus.

As previously described, if a data bit is lost in the earlier architecture, the characters do not decode correctly, the ID codes cannot be found and the data cannot be interpreted until the end sentinel is reached. Only then is it possible to determine that an integer number of characters has not been read and attempt to reconstruct the data by reading backwards to look for the lost bit. If, however, a data field starting with a data sentinel occurs, the timing (i.e. first bit position of the subsequent data character) can be reestablished using the pulse output from the "data-trap" hardware (i.e. the data sentinel identity comparator) and then parsing the data field accordingly. In this fashion the remaining portion of the data can be read correctly. Since certain data has higher value than other data, this feature can be used to protect especially valuable data fields even though they are contained within the start sentinel/end sentinel architecture. Therefore, data sentinels with the same first data character as the field sentinel assigned to the corresponding data source will be transparent to the normal decoding procedures of the previously developed architecture while providing an option for safeguarding especially valuable data.

FIG. 5a illustrates such use of an embedded data sentinel within a start/end sentinel architecture. In this embodiment, all of the characters are 8 bits long, single character ID codes are employed, LRC characters replace parity characters, and the first character of the data sentinel acts as a field sentinel. FIG. 5b shows how the embedded data sentinel can be advantageously employed to reduce data loss from a drop-out and preserve especially valuable data in the data field containing the data sentinel.

The direction of reading a data stream is of obvious consequence in decoding the data fields properly. This places an additional restriction on the selection of data sentinel character pairs when they are not embedded in the start sentinel/end sentinel architecture, and no other directional signal is provided. In order to indicate the direction of the data stream, the data sentinel character pair is preferably asymmetrical. In this way, the data sentinel when read backwards will not simply provide a data valid signal and create a timing mark to indicate a data character boundary, but will also be interpretable as the backwards data sentinel providing a directionality indication.

Figure 6:
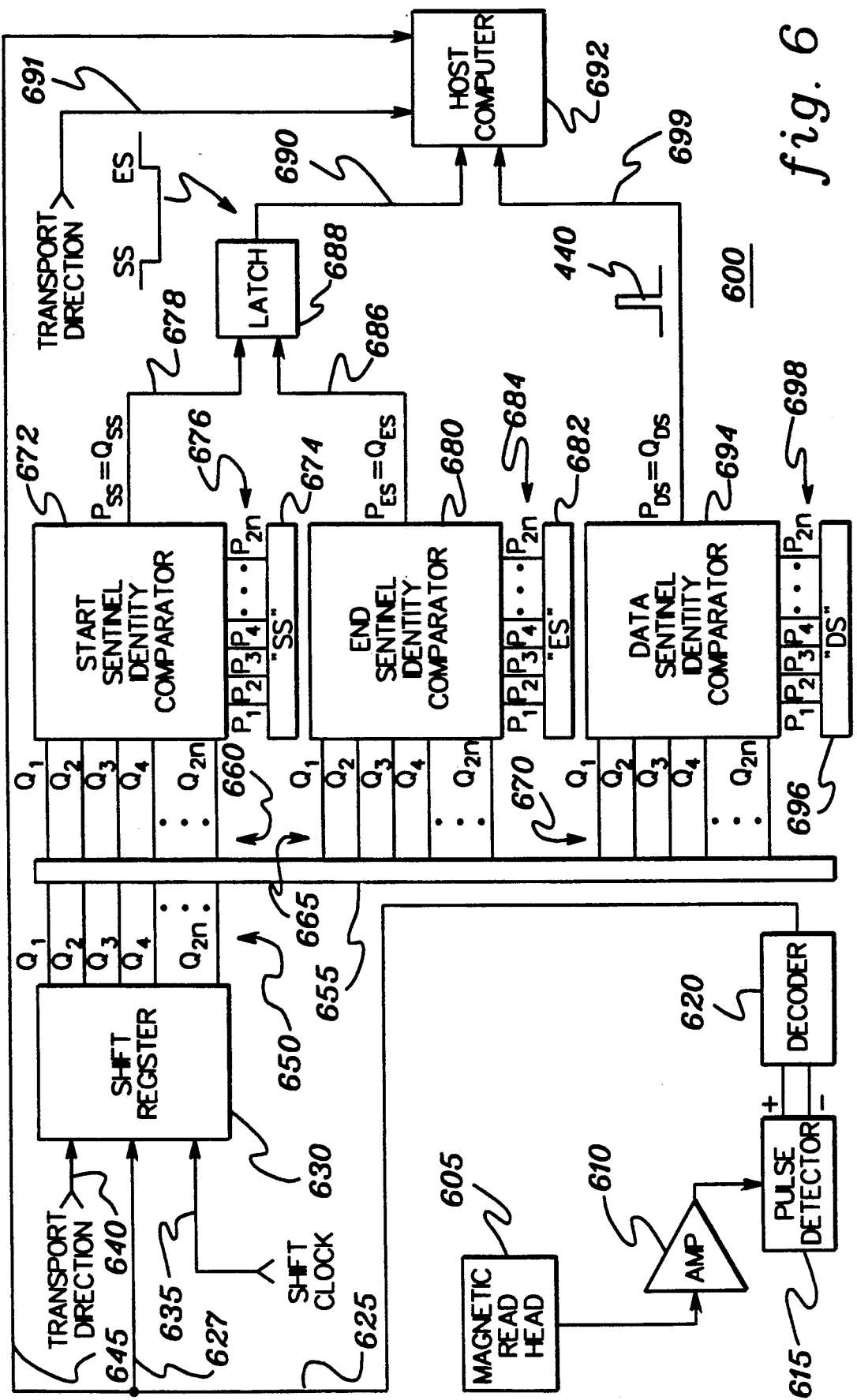
FIG. 6 is a schematic diagram of read out apparatus for data fields formatted in accordance with the principles of the present invention.

FIG. 6 illustrates read out apparatus especially designed for use with the data field format of the present invention. Read out apparatus 600 includes a magnetic read head 605 for reading bits recorded along a track in pulse position encoded form. An output signal from read head 605 is amplified by amplifier 610 and then provided to pulse detector 615. Pulse detector 615 provides a positive pulse signal indicative of occurrence of each positive pulse in said amplified output signal and a negative pulse signal indicative of occurrence of each negative pulse to decoder 620. Decoder 620, in known fashion, generates a serial bit stream from the input positive and negative pulse signals. Suitable exemplary decoding circuitry is described in commonly assigned U.S. Pat. Nos. 4,876,697 and 4,964,139 and 4,965,575, the disclosures of which are incorporated herein by reference. The serial bit stream from decoder 620 is provided along lines 625 and 627 to a shift register 630 and also, along line 645 to a host computer or other processor 692.

In addition to the serial bit stream, shift register 630 also receives a transport direction signal 640 and a shift clock signal 635. In response to these inputs, shift register 630, in conventional fashion transforms the serial bit stream into parallel form outputting sequentially every 2n consecutive bits ($Q_1$-$Q_{2n}$)of the stream, on parallel bit lines 650 (where n represents the bit length of a character). Data sentinel identity comparator 694 compares every 2n consecutive bit sequence ($Q_1$-$Q_{2n}$) received on lines 670 with a bit pattern 698 of the data sentinel 696. When a compared 2n consecutive bit sequence is identical to the bit pattern of the data sentinel ($P_{DS}=Q_{DS}$), a pulse output is provided along line 699 to the host computer 692. Host computer 692 uses the pulse output from data sentinel identity comparator 694 to parse the serial bit stream of the data field received along line 645 into n-bit characters. The read data sentinel is employed to interpret and decode the data characters of the field.

When a data field employing the data sentinel format is imbedded within the start sentinel/end sentinel architecture, a start sentinel identity comparator 672 and an end sentinel identity comparator 680 are added to the read out apparatus. Like the data sentinel identity comparator 694, start sentinel identity comparator 672 and end sentinel identity comparator 680 are provided with every 2n consecutive bit sequence of the serial bit stream from shift register 630 via data bus 655 and their respective input lines 660 and 665. When start sentinel identity comparator 672 detects a match ($P_{SS}=Q_{SS}$) with the programmed bit pattern 676 of the start sentinel 674, a start sentinel occurrence signal is provided along line 678 to latch 688. Similarly when a match ($P_{ES}=Q_{ES}$) is detected by end sentinel identity comparator 680, an end sentinel occurrence signal is sent along line 686 to latch 688. Latch 688 provides an output signal along line 690 to host computer 692 which is valid (low), as shown, during the time interval between detection of the start sentinel and detection of the end sentinel.

The data sentinel format described herein is particularly useful in those instances where: the head-to-film interface is known to be of relatively poor quality and it is therefore desirable to write the data field several times to ensure successful data transfer; the particular data is very important and system integrity can be maintained by taking measures to especially safeguard the most important data; and data is to be written without reference to frame boundaries.

Limitations in recording data using this new data field format occur because only a relatively few reserved character pairs satisfy the requirements of a trappable data sentinel. For example, using 7-bit ASCII plus odd parity and assigning the ASCII values 0-15 and 124-127 as reserved data characters, there are only 33 reserved character pairs that meet the requirement of forming a unique 16-bit sequence in the presence of all other legal character sequences. Other desirable characteristics of the data sentinel character pair (e.g. asymmetry, the first character being the same as a field sentinel to be transparent in the start sentinel/end sentinel architecture and identify the source of data, and/or the second character serving as an ID code to identify the nature of the data recorded in the field) further restrict the list of acceptable data sentinels. (An exemplary data sentinel character pair might be ASCII 124, 125 which form the asymmetrical bit sequence 0111100, 11111101. ) Accordingly, use of the data sentinel format is likely to be most important in cases where a limited data set is repetitively recorded along the track or particular data is of very high value.

From the foregoing description, it will be apparent that a new approach for reducing overhead and data loss and enhancing the reliability of data transfer between stages of photographic filmstrip use and processing has been developed. The new approach can be implemented independently or embedded within an existing start sentinel/end sentinel architecture.

Although particular embodiments have been described and depicted herein, it will be apparent to those skilled in this art that various modifications, substitutions, additions, and the like may be made without departing from the spirit of the invention, the scope of which is defined by the claims appended hereto.

We claim:

1. Apparatus for use in a stage of film use and processing wherein the film comprises an elongate photographic film strip having successive frames and wherein data is transferred between stages via a magnetic layer of the film strip, comprising:
    first means for reading data magnetically recorded in a track in said magnetic layer, said track including a data field comprising a trappable data sentinel and one or more data characters;
    second means for unambiguously identifying the trappable data sentinel in the read data; and
    third means for: determining, in response to identification of said data sentinel, a character boundary for said data field; parsing the data field into characters beginning at said character boundary; and interpreting so parsed data characters of said field based upon reading of said data sentinel.

2. The apparatus of claim 1 wherein said trappable data sentinel comprises a character pair, each character of said pair and the data character being n-bits long.

3. The apparatus of claim 2 wherein each character of said pair comprises a reserved sequence of n binary bits which sequence may not be used as a data character.

4. The apparatus of claim 3 wherein a first character of said character pair defines a beginning of the data field, and a second character of said character pair identifies the type of data recorded in the field.

5. The apparatus of claim 4 wherein said first character also identifies a source of the data recorded in the field, and said second character provides an indication of content, length and structure of the data field.

6. The apparatus of claim 5 further comprising memory means for storing a universal identification code dictionary and a universal symbol dictionary for use in interpreting data characters and the characters of the data sentinel.

7. The apparatus of claim 3 wherein said character pair is asymmetrical.

8. The apparatus of claim 4 wherein the data character and each character of said character pair are recorded in pulse position encoded form.

9. The apparatus of claim 4 wherein said stage comprises a photofinisher.

10. The apparatus of claim 4 wherein said data field further comprises a longitudinal redundancy check character at an end of said field.

11. The apparatus of claim 10 further comprising means for reading a trappable start sentinel at a beginning of said track and a trappable end sentinel at an end of said track.

12. The apparatus of claim 2 wherein:

said first means comprises magnetic read means for reading bits along said track and generating therefrom a corresponding serial bit stream;

said second means comprises comparison means for comparing every 2n consecutive bit sequence of said serial bit stream with a bit pattern of the data sentinel and generating an output pulse when a 2n consecutive bit sequence of the serial data stream is identical to the bit pattern of the data sentinel; and said third means comprises processor means for receiving said serial bit stream and output pulse, parsing said serial bit stream into characters with reference to said output pulse, and interpreting said characters.

13. The apparatus of claim 12 wherein said comparison means comprises a shift register having 2n parallel bit output lines connected to a data sentinel identity comparator.

14. The apparatus of claim 13 wherein all characters are recorded in the track in pulse position encoded form; and wherein said magnetic read means comprises: a magnetic read head, pulse detector means for receiving an amplified output signal from said magnetic read head and providing a positive pulse signal indicative of occurrence of a positive pulse in said amplified output signal and a negative pulse signal indicative of occurrence of a negative pulse in said amplified output signal, and decoding means for generating said serial bit stream from said positive pulse and negative pulse signals.

15. The apparatus of claim 14 wherein said track includes a trappable start sentinel at a start of said track and a trappable end sentinel at an end of said track; and further comprising:

start sentinel identity comparator means for comparing every 2n consecutive bit sequence of the serial bit stream with a bit pattern of the start sentinel and generating a start sentinel signal when a compared 2n consecutive bit sequence is identical to the bit pattern of the start sentinel;

end sentinel identity comparator means for comparing every 2n consecutive bit sequence of the serial bit stream to a bit pattern of the end sentinel and generating an end sentinel signal when a compared 2n consecutive bit sequence is identical to the bit pattern of the end sentinel; and logic means for receiving said start sentinel signal and said end sentinel signal and providing a data valid signal to said processor means for a time interval extending from occurrence of the start sentinel signal until occurrence of said end sentinel signal.

16. The apparatus of claim 15 wherein said start sentinel identity comparator means comprises a start sentinel identity comparator connected to the 2n parallel bit output lines of the shift register, and wherein said end sentinel identity comparator means comprises an end sentinel identity comparator connected to the 2n parallel bit output lines of said shift register, and wherein said logic means comprises a latch.

17. The apparatus of claim 4 wherein said track comprises multiple consecutive data fields; each field comprising a data sentinel character pair, at least one data character, and an error checking character; and said means for reading a data field reads all of said data fields.

18. The apparatus of claim 17 wherein said track extends lengthwise along said photographic filmstrip and is frame limited in length, and wherein data fields in said track are identical.

19. In a method for transferring data from a first stage to a second stage of photographic film strip use and processing wherein data is magnetically recorded in a data field in a magnetic layer of an elongate photographic film strip at said first stage for readout by a magnetic read head at said second stage, and wherein the data is susceptible to corruption error during data transfer, the improvement comprising:

defining a trappable data sentinel comprising a particular sequence of bits which appears nowhere else in a valid data stream;

formatting said data field in the following sequence: the trappable data sentinel, one or more data characters, and an error checking character;

recording the formatted data field in a track in the magnetic layer of the photographic film strip at said first stage; and at the second stage:

detecting the data sentinel;

reading the data field;

parsing the read data field into characters with reference to a character boundary established in response to the detected data sentinel; and interpreting the data characters with reference to a data type identification provided by the data sentinel.

20. The improved method of claim 19 wherein said data sentinel comprises a reserved asymmetrical character pair.

21. The improved method of claim 19 wherein said detecting step comprises detecting the data sentinel with an identity comparison.

22. The improved method of claim 19 further comprising the steps of:

recording at said first stage a trappable start sentinel and a trappable end sentinel at a beginning and an end, respectively, of said track; and detecting said start sentinel and end sentinel at said second stage and generating therefrom a signal which corresponds to a time interval between detection of said start sentinel and detection of said end sentinel.

23. The improved method of claim 22 wherein said start sentinel, end sentinel and data sentinel each comprise a unique pair of reserved characters.

24. The improved method of claim 23, wherein the character pair of the data sentinel comprises a first character which indicates a beginning of the data field and identifies a source of data in the data field, and a second character which provides an indication of the content, length and structure of the data field.

* * * * *